June 19, 1951 C. F. SHEAFFER 2,557,239
FREQUENCY SELECTIVE CIRCUITS
Filed Dec. 5, 1946
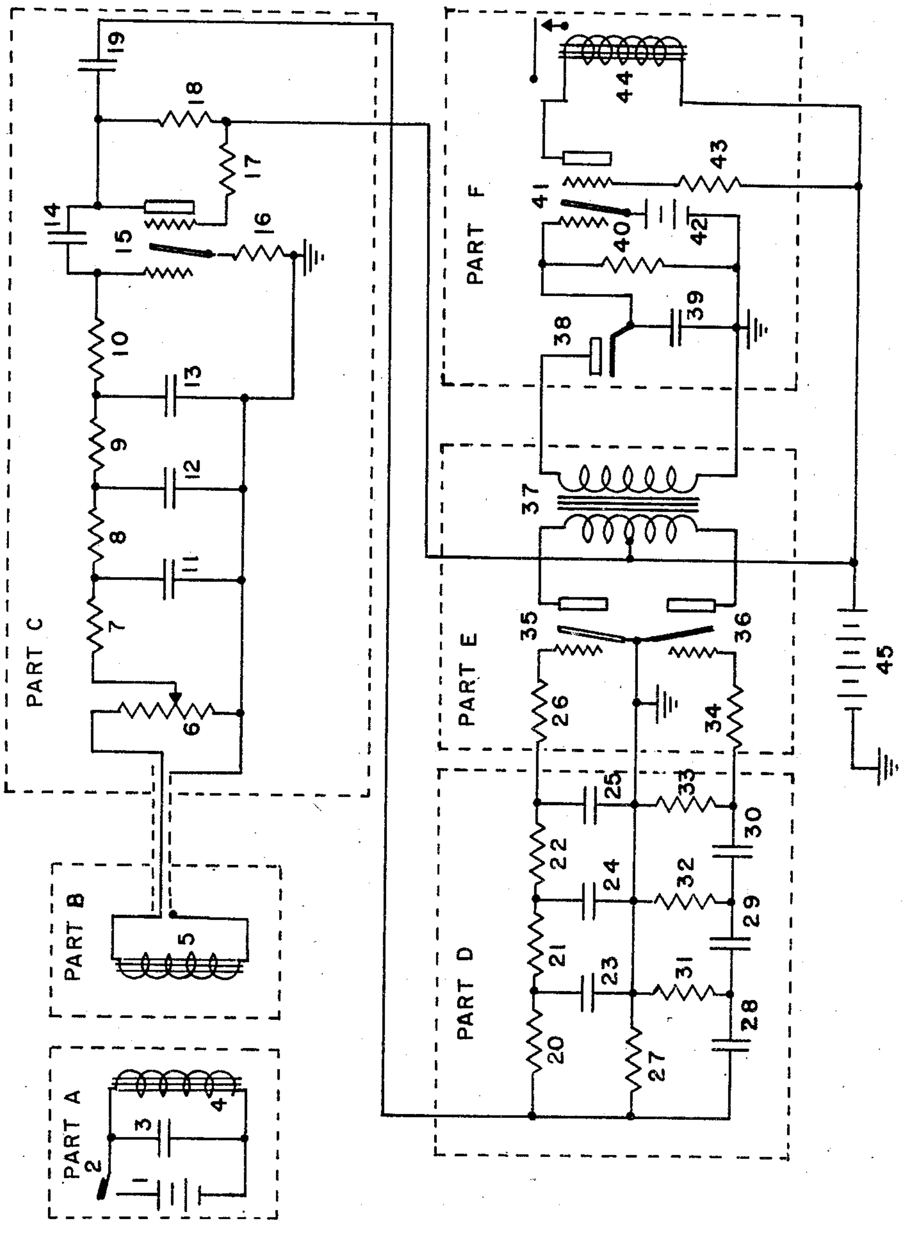
Charles F. Sheaffer
Inventor
by Ben. J. Chromy
his attorney.

Patented June 19, 1951

2,557,239

UNITED STATES PATENT OFFICE 2,557,239

FREQUENCY SELECTIVE CIRCUITS

Charles Fremont Sheaffer, Oklahoma City, Okla.

Application December 5, 1946, Serial No. 714,205

7 Claims. (Cl. 250—27)

This invention relates generally to frequency selective circuits, and more particularly to electronic means of producing frequency selectivity, and applications related thereto.

An object of this invention is to provide a device which will initiate operation of a control circuit through momentary closing of relay contacts when a short burst of alternating current of predetermined frequency is applied to its input.

Another object of this invention is to afford means for operating, or initiating operation of any number of separate relay control circuits through a single wire circuit or communication channel.

Still another object of this invention is to provide a device which is highly frequency selective to damped wave trains, as well as bursts of undamped alternating electrical energy.

Briefly in accordance with this invention I provide an apparatus having an input circuit with which is associated suitable means for applying or inducing an alternating potential therein. A low pass filter arranged to attenuate high frequency transients is associated with the apparatus to receive the aforesaid alternating potential and an amplifier is connected to the output of this low pass filter. The output of the amplifier is fed to a pair of filters one of which is a low pass filter and the other of which is a high pass filter and the outputs of these filters are arranged in a sort of push-pull circuit and applied to the opposite tubes of a push-pull distortion producing amplifier so that one grid of this push-pull distortion producing amplifier is supplied from the output of the low pass filter and the other grid of the push-pull amplifier is supplied from the output of the high pass filter. A pulse transformer is connected in push-pull fashion to the two plates of the distortion producing amplifier and this pulse transformer converts the substantially square wave currents applied thereto into narrow pulse voltages which are supplied to a rectifier and filter arrangement. The grid of another amplifier is energized from the output of this rectifier and filter arrangement for controlling the operation of a relay that is connected to the plate of this amplifier whereby the relay is operated when the correct frequency voltage is supplied to the input circuit of the apparatus. Considered functionally, the application of a voltage of the correct frequency will produce equal and opposite phase shifts of 90 degrees in each of the filters supplying the distortion producing amplifier causing the two grids to receive anti-phase voltages and thereby causing the plate current changes to occur simultaneously and in phase across the pulse transformer primary. If an incorrect frequency is applied, delay angles through the low and high pass filters are no longer 90 degrees. The resulting current changes do not occur simultaneously in this case and therefore the voltage produced in the secondary of the pulse transformer has only half the amplitude of that produced when the correct frequency is applied. Components are so chosen that this amount of voltage is not sufficient to cause operation of the relay circuit.

For a complete understanding of my invention, reference is made to the accompanying drawing in which the single figure illustrates a diagrammatic circuit arrangement conforming thereto.

In the drawing, apparatus A represents a source of damped wave induction field energy. Within the apparatus A, battery 1 is connected through push button 2 to coil 4, and a capacitor 3 is connected in parallel with coil 4, thereby forming a resonant circuit which oscillates when push button 2 is depressed and released. The oscillations thus produced create an induction field in the area surrounding the coil 4.

Apparatus B contains coil 5 which is so designed and arranged that it will pick up an alternating potential from the apparatus A when this apparatus is energized, that is, when push button 2 is depressed and released.

Apparatus C includes signal level adjustor or potentiometer 6, a low pass ladder structure consisting of series resistors 7, 8, and 9 with shunt arm capacitors 11, 12, and 13, and an amplifier including resistor 10, capacitor 14, tube 15, resistors 16, 17 and 18 and capacitor 19. In the amplifier, a high resistor 10 is connected in the grid circuit of the amplifier tube 15 to cause the grid to ground impedance to be high at all frequencies used in this device. The lower part of the potentiometer 6 and resistors 7, 8, 9 and 10 are connected in series in the grid to ground circuit of the apparatus as illustrated and the resistor 16 is connected in series between the tube cathode and ground so as to develop a suitable bias voltage between the grid and the cathode. Capacitor 14 is connected from grid to plate of tube 15 and provides a high degree of degenerative feed back for all frequencies above those desired in the operation of the unit.

Apparatus D receives signals through coupling capacitor 19 of apparatus C and contains a low pass ladder structure consisting of resistors 20, 21 and 22 and capacitors 23, 24, and 25, and a high pass ladder structure consisting of capacitors 28, 29, and 30 and resistors 31, 32 and 33. Resistor 27 is connected across the inputs of the low pass and high pass filters.

Apparatus E contains a distortion producing amplifier comprising tubes 35 and 36 and a pulse transformer 37. Vacuum tubes 35 and 36 are preferably of the high mu type such as, for instance, type 6SL7. The tubes 35 and 36 are connected to the outputs of the low pass filter and the high pass filter respectively through grid current limiting resistors 26 and 34 respectively. Pulse transformer 37 is used to convert the current changes of tubes 35 and 36 into pulse voltages of short duration. The connections of this transformer to the two tubes are made in push-pull fashion so that for current changes in the transformer to be additive it is required that the driving voltages applied to the grids of the two tubes be 180 degrees out of phase with each other. The voltage sources from the low and high pass filters are adjusted to levels sufficient to drive the grid circuits of tubes 35 and 36 periodically between cut-off and grid saturation. Resistors 26 and 34 are grid current limiting resistors. Their function is to minimize phase shifts resulting from positive drives of the grids and to cause grid voltage during a positive cycle of excitation to be limited.

Apparatus F includes rectifier diode 38, diode filter capacitor 39, leak resistor 40, vacuum tube 41 and relay 44. Bias for tube 41 is supplied from battery 42 and screen voltage for tube 41 is supplied through resistor 43 from battery 45. When a pulse signal is supplied from pulse transformer 37 to the plate of diode 38, the resulting rectified output voltage appears across capacitor 39. If the voltage thus supplied is sufficient to overcome battery 42, plate current will flow through relay 44 and cause this relay to close its contacts. It is to be noted that the value of bias from battery 42 is sufficient to prevent operation of relay 44 for all cases except where pulses resulting from current changes in tubes 35 and 36 are in such phase across the pulse transformer so that the resulting pulse voltages induced into the secondary are additive. This latter case occurs only when alternating voltage of the correct frequency is applied to the input circuit of apparatus C.

Considering now the operation of the device as a whole, assume a voltage of frequency $f$ is induced into apparatus B. High frequency transients resulting from abrupt starting of the voltage are attenuated to insignificant values by the low pass filter and degenerative feed back amplifier in apparatus C. The frequency $f$ is amplified by amplifier 15, however and drives the low and high pass filters of apparatus D. The low pass filter retards the phase of $f$ by an amount $\phi$, and the high pass filter advances the phase of $f$ by an amount $-\theta$. The phase between the voltages applied to the grids of the distortion producing amplifier tubes 35 and 36, is therefore $\phi+\theta$. Tubes 35 and 36 are considerably overdriven so that their individual plate currents are of substantially square waveform, and pulse transformer 37 converts the steep faces of these current waves into sharp pulses. It is to be noted that if $\phi+\theta=180$ degrees, the current changes in the plates of both tubes occur simultaneously and the induced pulse voltages are additive in the pulse transformer resulting in a doubling of the amplitude of the pulse voltage appearing in the secondary thereof. If $\phi+\theta$ is somewhat less or more than 180 degrees, voltage doubling does not take place due to the fact that the current changes occurring in the plates of the two tubes do not take place simultaneously. Design parameters are so selected that relay 44 is not closed by current from vacuum tube 41 unless voltage doubling occurs, i. e.: when frequency $f$ is of the proper value to cause combined phase shifts of 180 degrees as explained above.

It has been found that this apparatus functions satisfactorily to produce the desired results when a frequency $f$ of 300 cycles is employed and for this purpose the capacitor 3 and inductance 4 are tuned to resonate at this frequency. Other frequencies may, of course, be employed if desired. Without limiting this invention to any specific values for the components thereof since obviously components of various values may be employed, the following values for the components shown in the drawing are given:

Inductor 5, open core, 50 hy.
Potentiometer 6, 100,000 ohms.
Resistor 7, 100,000 ohms.
Resistor 8, 200,000 ohms.
Resistor 9, 400,000 ohms.
Resistor 10, 400,000 ohms.
Capacitor 11, 0.003 mfd.
Capacitor 12, 0.002 mfd.
Capacitor 13, 0.001 mfd.
Capacitor 14, 0–25 mmfd. adjustable.
Vacuum tube 15, type 6SJ7.
Resistor 16, 500 ohms.
Resistor 17, 250,000 ohms.
Resistor 18, 50,000 ohms.
Coupling capacitor 19, 0.1 mfd.
Resistor 20, 100,000 ohms.
Resistor 21, 200,000 ohms.
Resistor 22, 400,000 ohms.
Capacitor 23, 0.003 mfd.
Capacitor 24, 0.0015 mfd.
Capacitor 25, 0.0008 mfd.
Resistor 26, 3 megohm.
Resistor 27, 100,000 ohms.
Capacitor 28, 0.0055 mfd.
Capacitor 29, 0.0027 mfd.
Capacitor 30, 0.0014 mfd.
Resistor 31, 170,000 ohms.
Resistor 32, 340,000 ohms.
Resistor 33, 680,000 ohms.
Resistor 34, 3 megohm.
Twin triode 35, 36, type 6SL7.
Diode rectifier 38, type 6H6.
Capacitor 39, 0.01 mfd.
Resistor 40, 10 megohms.
Vacuum tube 41, type 6SH7.
Resistor 43, 50,000 ohms.
Battery 45, plate voltage supply, 250 volt.

The values of resistors 23 and 33 are initially adjusted to align the response of this system to the selected frequency.

The apparatus of this invention may be employed to control or actuate the electric circuit of the Door Operating Mechanism disclosed in my application for Letters Patent Serial No. 702,292, filed October 9, 1946, now abandoned.

While I have described my invention in what is believed to be a preferred embodiment thereof, it will be observed that variations therefrom are possible without departing from the spirit and scope of this invention. It is possible, for instance, to eliminate apparatus A and apparatus B and use a telephone line or a radio communication channel for supplying alternating voltage to apparatus O. Apparatus A and apparatus B are required only where it is desired to exert control over short distances without wire connections. It is also possible to use coil and capacitor type filters instead of the resistor and capacitor types shown in the drawing. It is further possible to use differentiating circuits for producing the pulses instead of the pulse transformer. I intend to be limited therefore only to the extent of the claims included herein.

Having described my invention, I claim:

1. An electronic frequency selective system comprising an input circuit, means for applying an alternating potential to said input circuit, a low pass filter for attenuating high frequency transients connected to said input circuit, an amplifier connected to said low pass filter, a low pass filter and a high pass filter having inputs thereof connected in parallel to the output of said amplifier, a push-pull distortion producing amplifier having one grid electrode thereof supplied from the output of said last-mentioned low pass filter and having the other grid thereof supplied from the output of said high pass filter, a pulse transformer connected in push-pull fashion to the plates of said distortion producing amplifier for producing narrow voltage pulses in the output thereof, means for rectifying said narrow voltage pulses and a control device connected to said last mentioned means, said control device being operable when the pulses derived from said push-pull amplifier tubes are substantially coincident.

2. In an electronic frequency selective system the combination of a low pass ladder structure, a degenerative amplifier having negative feedback at frequencies higher than the desired frequencies connected to said low pass ladder structure, a pair of phase shifting circuits connected to the output of said amplifier, means coupled to the outputs of said phase shifting circuits for generating pulses from said outputs, and means responsive to said pulses only when the frequency of said signal is such that said pulses occur substantially simultaneously.

3. In an electronic frequency selective system the combination of a low pass ladder structure, a degenerative amplifier having negative feedback at frequencies higher than the desired frequencies connected to said low pass ladder structure, a low pass ladder structure and a high pass ladder structure connected in parallel, connections for connecting said low pass and said high pass ladder structures to the output of said amplifier, means coupled to the outputs of said last mentioned structures for generating pulses from said outputs, and means responsive to said pulses only when the frequency of said signal is such that said pulses occur substantially simultaneously.

4. In an electronic frequency selective system the combination of a low pass ladder structure, a degenerative amplifier having negative feedback at frequencies higher than the desired frequencies connected to said low pass ladder structure, a low pass ladder structure and a high pass ladder structure connected in parallel, connections for connecting said low pass and said high pass ladder structures to the output of said amplifier, a push-pull distortion producing amplifier coupled to the outputs of said last mentioned ladder structures, a transformer connected to said push-pull amplifier for generating narrow pulses from said outputs, and means responsive to said pulses only when the frequency of said signal is such that said pulses occur substantially simultaneously.

5. In an electronic frequency selective system, the combination of means for attenuating high frequency transients, a low pass and a high pass filter connected to receive signals from said means, a push-pull distortion producing amplifier, means for connecting said low and high pass filters to said push-pull distortion producing amplifier, a pulse transformer connected to the plate circuit of said push-pull amplifier, a rectifier connected to the output of said pulse transformer, an amplifier connected to said rectifier so that said rectifier applies positive voltage to the grid of said last mentioned amplifier, and a control circuit connected to said last mentioned amplifier, said control circuit being operable only when the amplitude of the rectified voltage reaches a value obtained when said low and high pass filters produce combined phase shifts such that resulting plate current changes in each tube of said distortion producing amplifier as applied to said pulse transformer take place at substantially the same instant but in opposite directions.

6. Apparatus for transmitting intelligence, including a transmitter for transmitting a voltage of predetermined frequency, a receiver comprising a low pass filter, a selective amplifier, phase shifting means for deriving two voltages approximately 180 degrees out of phase with each other, two pulse forming networks connected to be energized from said last mentioned means, means for deriving a voltage proportional to the sum of the pulse voltages of said two networks at said predetermined frequency, a control circuit and a biased amplifier connected to control said control circuit such that no response is obtained if said last mentioned voltage is not equal to a predetermined amplitude.

7. Apparatus for transmitting intelligence including a source of voltage, a communication link, a frequency selective receiving unit including phase shifting networks, pulse forming networks energized from said phase shifting networks, so that two sets of pulses are derived, said phase shifting networks being adjusted so that the time position of one of said sets of pulses with respect to the other set of pulses is a function of the applied frequency, means for combining said pulses so that the resulting pulse voltages add under conditions where the pulses in said sets of pulses occur simultaneously, and control means connected to be operated only by said added pulse voltages.

CHARLES FREMONT SHEAFFER.

REFERENCES CITED

The following references are of record in the file of this patent:

UNITED STATES PATENTS

| Number | Name | Date |
|---|---|---|
| Re. 21,659 | Adler | Dec. 17, 1940 |
| 1,377,573 | Fortesque | May 10, 1921 |
| 1,555,893 | Thompson | Oct. 6, 1925 |
| 2,022,790 | Sturdy | Dec. 3, 1935 |
| 2,027,214 | Wideroe | Jan. 7, 1936 |
| 2,104,801 | Hansell | Jan. 11, 1938 |
| 2,151,127 | Logan et al. | Mar. 21, 1939 |
| 2,399,322 | Carlin | Apr. 30, 1946 |
| 2,497,965 | Usselman | Feb. 21, 1950 |